UNITED STATES PATENT OFFICE.

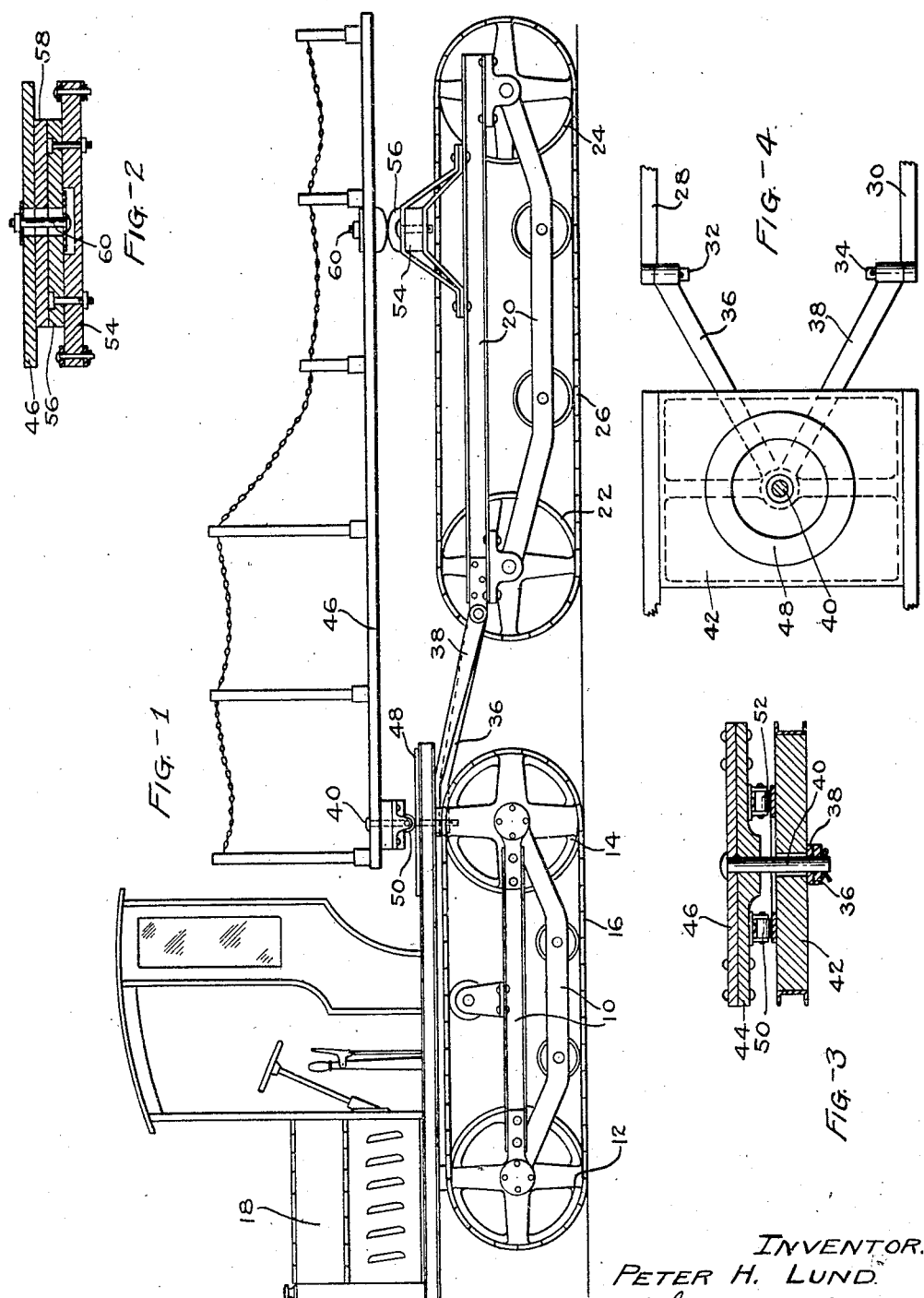

PETER H. LUND, OF MINNEAPOLIS, MINNESOTA.

MOTOR-VEHICLE.

1,363,988.

Specification of Letters Patent.

Patented Dec. 28, 1920.

Application filed November 19, 1919. Serial No. 339,037.

*To all whom it may concern:*

Be it known that I, PETER H. LUND, a citizen of the United States, residing at Minneapolis, in the county of Hennepin and State of Minnesota, have invented certain new and useful Improvements in Motor-Vehicles, of which the following is a specification.

My invention relates to motor vehicles and an object is to provide a tractor and an attached trailer which may be readily driven over soft ground without danger of becoming stalled by sinking into the ground. For this purpose I provide a tractor and a trailer which are both of the crawler or belt, self track-laying, type and provide connections between the tractor and the trailer which will permit the trailer to have sufficient freedom of movement to accommodate it to the character of the ground and the movements of the tractor while being pulled by the latter.

The full objects and advantages of my invention will appear in connection with the detailed description thereof and the novel features of my inventive idea will be particularly pointed out in the claim.

In the accompanying drawings, which illustrate the application of my invention in one form,—

Figure 1 is a view in side elevation showing a tractor and a trailer attached thereto. Fig. 2 is a view in section lengthwise through the rear bolster. Fig. 3 is a view in section lengthwise through the front bolster. Fig. 4 is a top plan view showing the attachment of the trailer to the rear of the tractor.

Referring to the construction shown in the drawings, 10 designates the frame of a tractor which is provided with tractor belt mechanism including wheels 12 and 14 over which runs a tractor belt 16 and there may be one of these belts mounted at each side of the tractor in the customary manner. The tractor is provided with an engine 18 of any suitable construction for driving the traction belt mechanism in the usual manner. The frame 20 of the trailer is provided with a supporting belt mechanism which includes the wheels 22 and 24 over which runs the belt 26 and there may be one of these belts mounted at each side of the trailer. The frame of the trailer includes two longitudinal beams 28 and 30, Fig. 4, and to the front ends of these beams are attached castings having horizontal bearing pins 32 and 34 upon which are journaled the rear ends of two connecting bars 36 and 38. These bars converge forwardly so as to overlap at their front ends which are provided with holes through which extends a king bolt 40. This bolt extends loosely through the floor 42 of the tractor and also extends through a bolster 44 which is secured to the front end of a platform or load-bearing support 46. The floor of the tractor is provided with a circular track 48 upon which rest rollers 50 and 52 mounted in bearings secured to the bolster 44. A rear bolster 54 is secured to the frame of the trailer at a place back of the center of said frame. A rocking member 56 having a rounded surface is secured to the upper side of this bolster and upon this member 56 rests a rocking member 58 also having a rounded surface and being secured to the platform 46. A bolt 60 extends loosely through the rocking members and through the platform 46 and permits sufficient play to accommodate the movements of the trailer.

The operation and advantages of my invention will be readily understood in connection with the foregoing description. The frame of the trailer is connected to the tractor by the bars 36 and 38 in such manner that swaying and oscillating movements of the trailer are permitted and the trailer will readily follow the tractor in whatever direction the latter is steered. On account of the platform 46 being rockably supported back of the center of the trailer the latter passes readily over obstructions. The front of the platform is attached to the tractor in such manner as not to interfere with the necessary flexibility of movement of the trailer while being pulled. Since the tractor and the trailer are both of the crawler type driving over soft ground is readily accomplished.

I claim:

A motor vehicle comprising a tractor having a traction belt mechanism for propelling the same over the ground, a trailer having a frame provided with a belt mechanism for supporting and permitting the trailer to be pulled over the ground, a king bolt mounted in the rear portion of said tractor, a pair of connecting bars, horizontally and pivotally attached to the sides of said trailer frame at the front portion thereof, said bars converging forwardly and being pivotally attached to said king pin, a load support, having its rear portion mounted upon said trailer behind the center thereof and means on the forward portion of said load support for pivotally attaching the same to said king pin.

In testimony whereof I hereunto affix my signature.

PETER H. LUND.